US006751644B1

United States Patent
Chng et al.

(10) Patent No.: US 6,751,644 B1
(45) Date of Patent: Jun. 15, 2004

(54) METHOD AND APPARATUS FOR ELIMINATION OF INHERENT CARRIES

(75) Inventors: Choon-Ping Chng, Sunnyvale, CA (US); Tzungren Allan Tzeng, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/542,748

(22) Filed: Apr. 4, 2000

Related U.S. Application Data

(63) Continuation-in-part of application No. 09/396,236, filed on Sep. 15, 1999.

(51) Int. Cl.[7] .................................................. G06F 7/38
(52) U.S. Cl. ...................................................... 708/501
(58) Field of Search ........................................ 708/501

(56) References Cited

U.S. PATENT DOCUMENTS

| | | | | |
|---|---|---|---|---|
| 5,796,644 A | * | 8/1998 | Jiang | 708/501 |
| 5,880,984 A | * | 3/1999 | Burchfiel et al. | 708/501 |
| 5,928,316 A | * | 7/1999 | Wong et al. | 708/501 |
| 6,115,729 A | * | 9/2000 | Matheny et al. | 708/501 |
| 6,282,557 B1 | * | 8/2001 | Dhong et al. | 708/501 |
| 6,542,916 B1 | * | 4/2003 | Hinds et al. | 708/501 |

OTHER PUBLICATIONS

"Computer Architecture A Quantitative Approach," Second Edition, by John L. Hennessy & David A. Patterson, *Appendix A: Computer Arithmetic* by David Goldberg, 1996.

"A Method And Apparatus For Performing Fused Instruction," by Choon–Ping Chng and Tzungren Allan Tzeng, U.S. application No. 09/542,317.

* cited by examiner

*Primary Examiner*—Tan V. Mai

(57) ABSTRACT

A fused instruction datapath is disclosed. The fused instruction datapath may include a normalization unit, a floating point mutltiplier coupled to the normalization unit, and a mantissa alignment unit coupled to provide an aligned mantissa to the floating point multiplier. The floating point multiplier may include a term generation unit and a compensation unit coupled to the term generation unit. The term generation unit may be configured to generate a sum term and a carry term. The compensation unit may be configured to compensate the sum term.

12 Claims, 8 Drawing Sheets

METHOD AND APPARATUS FOR ELIMINATION OF INHERENT CARRIES

CROSS-REFERENCES TO RELATED APPLICATIONS

This application is a continuation-in-part of patent application Ser. No. 09/396,236, entitled "DOUBLE PRECISION FLOATING POINT MULTIPLIER HAVING A 32-BIT BOOTH-ENCODED ARRAY MULTIPLIER," filed Sep. 15, 1999 and having C. Chng and T. Tzeng as inventors. This application is assigned to Sun Microsystems, Inc., the assignee of the present invention, and is hereby incorporated by reference, in its entirety and for all purposes.

This application is related to patent application Ser. No. 09/542,317, entitled "A METHOD AND APPARATUS FOR PERFORMING FUSED INSTRUCTIONS," filed herewith and having C. Chng and T. Tzeng as inventors. This application is assigned to Sun Microsystems, Inc., the assignee of the present invention, and is hereby incorporated by reference, in its entirety and for all purposes.

BACKGROUND OF THE INVENTION

1. Field of the Invention

The present invention relates to computer processors, and, more particularly, to the processing of fused mathematical functions.

2. Description of the Related Art

One of the more common applications of floating-point units is in performing matrix operations. In digital signal processing applications (audio processing, graphics, simulation, and the like), a frequent matrix operation is multiplying a matrix by another a matrix (or vector), which is fundamentally the computation of an inner product, $x_1 y_1 + x_2 y_2 + \ldots + x_n y_n$. As can be seen, computing these inner products requires a series of multiply-add combinations.

Motivated by this need, a single instruction that computes (A*B)+C may be devised. This instruction is known as the fused multiply-add, and has a counterpart, the fused multiply-subtract (which, as might be expected, computes (A*B)−C; this may be viewed in the alternative as adding a negative number to the multiplication's result). For the sake of simplicity, these instructions are referred to herein as a fused multiply-add instruction. Although executing such an instruction requires the ability to read three operands at a time, such an instruction has the potential for improving the performance of computations involving inner products.

The fusing of the multiply instruction with the add (or subtract) instruction provides two main advantages. First, by combining the multiply and add (or subtract) instructions, the result can be computed more quickly. This results from a shorter instruction datapath, for example, as a result of one instruction being used instead of two. Second, there need only be one rounding operation performed. Moreover, the fused multiply-add instruction computes (A*B)+C exactly, rounding only after all the calculations have been completed. This reduction in rounding increases the accuracy of inner products.

SUMMARY OF THE INVENTION

Embodiments of the present invention support such functionality, while allowing such designs to occupy less area in an integrated circuit design and still provide accurate results. The adder array of the multiplier of the fused instruction's datapath can be minimized through the use of various techniques. By using techniques such as Booth recoding, the number of adders in the adder array can be reduced, thereby reducing the size of the multiplier and speeding its operation. However, the inventors determined that this could create anomalous results when the terms from the additions were combined with the value of C. Embodiments of the present invention detect such anomalous conditions and compensate therefor.

In one embodiment of the present invention, a method of executing a fused instruction is disclosed. The method includes calculating a number of terms from a first input term and a second input term, detecting an inherent carry in the terms, compensation for the inherent carry if the inherent carry exists in the number of terms resulting in a compensated term, and determining a fused instruction result by combining the compensated term with a third input term. The calculations performed can include, for example, calculating a number of Booth terms using a Booth recoding technique and calculating the number of terms by adding the number of Booth terms, and can result in a sum term and a carry term as the terms calculated.

In one aspect of the embodiment, detection of the inherent carry includes calculating a result by combining the sum and the carry terms, and indicating the result of the combination. If a carry out of the result has a value of one, the sum and the carry terms contain the inherent carry, and such is indicated. Otherwise, if a carry out of the result has a value of zero, the sum and the carry terms do not contain the inherent carry, and such is indicated. In such a scenario, the compensation performed includes extending the sum term with ones if existence of the inherent carry in the number of terms is indicated and extending the sum term with zeros if existence of the inherent carry in the number of terms is not indicated.

In another aspect of the embodiment, detection of the inherent carry includes examining a most significant bit of the carry term and indicating the result of the combination. If the most significant bit of the carry term has a value of one, the carry term contains an inherent carry, and such is indicated. Otherwise, if the most significant bit of the carry term has a value of zero, the carry term does not contain an inherent carry, and such is indicated. In such a scenario, the compensation performed includes extending the sum term with ones if existence of an inherent carry in the carry term is indicated and extending the sum term with zeros if existence of the inherent carry in the carry term is not indicated.

In another embodiment of the present invention, a fused instruction datapath is disclosed. Such a fused instruction datapath includes a normalization unit, a floating point multiplier and a mantissa alignment unit. The floating point multiplier is coupled to the normalization unit, and includes a term generation unit and a compensation unit coupled to the term generation unit. The mantissa alignment unit is coupled to provide an aligned mantissa to the floating point multiplier. It will be noted that a processor can be designed with such a fused instruction datapath. The mantissa alignment unit can include, for example, a mantissa alignment shifter and a mantissa alignment control circuit coupled to the mantissa alignment shifter. The floating point multiplier multiplies a first input number and a second input number, and the mantissa alignment control circuit can be designed to cause the mantissa alignment shifter to shift a mantissa of a third input number by a number of bit positions equal to a difference between an exponent of the third input number and a sum of an exponent of the first input number and an exponent of the second input number. The floating point multiplier further can also include a final adder, to which the mantissa alignment unit and the compensation unit are coupled. In one aspect of this embodiment, the term generation unit includes a term generator and an adder array. The adder array is coupled to the a term generator and is designed to generate a sum term and a carry term.

In one aspect of this embodiment, the compensation unit includes a word extender unit, coupled to receive a sum term from the term generation unit, and an extension control unit, coupled to receive a carry term from the term generation unit and to provide an extension control signal to the word extender unit.

In a further aspect of this embodiment, the extension control unit is designed to examine a most significant bit of the carry term, indicate the carry term contains the inherent carry via the extension control signal, if the most significant bit of the carry term has a value of one, and indicate the carry term does not contain the inherent carry via the extension control signal, if the most significant bit of the carry term has a value of zero. In such an aspect, the word extender unit is designed to extend the sum term with ones if existence of the inherent carry in the number of terms is indicated by the extension control signal, and extend the sum term with zeros if existence of the inherent carry in the number of terms is not indicated by the extension control signal.

In a still further aspect of this embodiment, the extension control unit is further coupled to receive the sum term from the term generation unit and designed to calculate a result by combining the sum and the carry terms. In such an aspect, the extension control unit is designed to indicate the sum and the carry terms contain the inherent carry via the extension control signal, if a carry out of the result has a value of one, and indicate the sum and the carry terms do not contain the inherent carry via the extension control signal, if the carry out of the result has a value of one. Also in such an aspect, the word extender unit is designed to extend the sum term with ones if existence of the inherent carry in the number of terms is indicated by the extension control signal, and extend the sum term with zeros if existence of the inherent carry in the number of terms is not indicated by the extension control signal.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
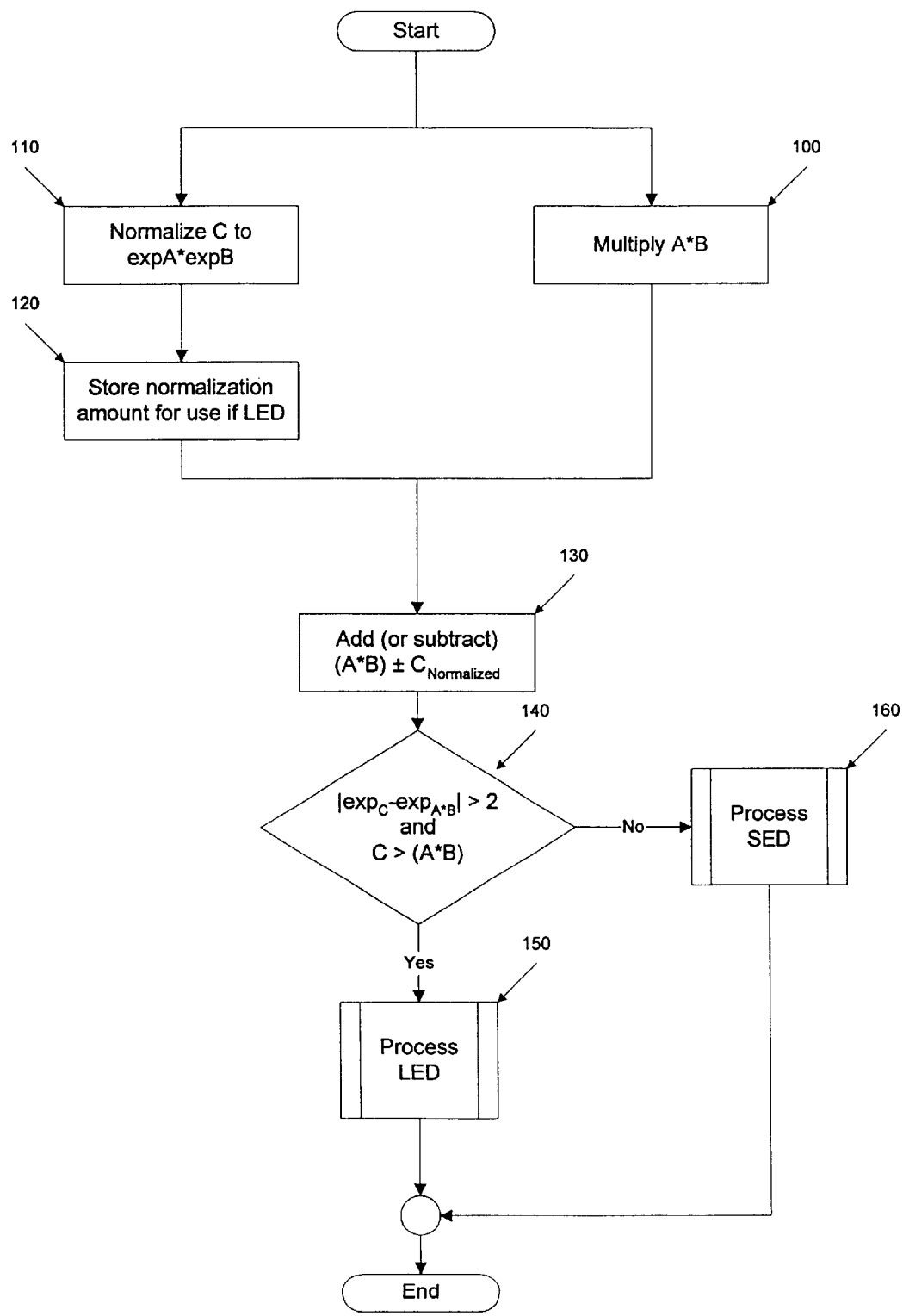
FIG. 1 is a block diagram illustrating generally a process of performing a fused instruction according to one embodiment of the present invention.

The following is intended to provide a detailed description of an example of the invention and should not be taken to be limiting of the invention itself. Rather, any number of variations may fall within the scope of the invention which is defined in the claims following the description. It will be noted that binary numbers are denoted herein by a suffix of "b" (e.g., decimal 4 in binary would read "100b").

It will be noted that, while fused instructions are discussed in terms of addition herein, the use of addition and subtraction are interchangeable in such circumstances. This is because a subtraction can be implemented by changing the sign of the number to be subtracted and performing the aforementioned addition. It will be further noted that the numbers manipulated by the methods described herein are preferably in some standard format and, more preferably, such numbers are formatted using the IEEE 754 standard for floating point numbers.

Under the IEEE 754 standard, a floating point number is represented by a sign bit, a mantissa, and an exponent. In such a representation, the first bit of the mantissa is assumed to be the most significant bit (i.e., a one), and is referred to as the "J" bit. When a binary number is in such a format, the number is referred to as being normalized, meaning that the number's mantissa has its most significant bit in the bit position farthest to the left (its most significant bit in the most significant bit position), and so makes maximum use of the precision available in the given mantissa. When performing floating point operations, the three elements of a number in IEEE 754 format are normally dealt with separately.

Introduction

While the benefits of a fused instruction (e.g., a fused multiply-add instruction (FMULADD) or a fused multiply-subtract instruction (FMULSUB)) are apparent, the inventors found that fusing a floating point add (or subtract) instruction with a floating point multiply instruction could present certain problems, depending on the approach taken to implementing such an instruction.

The inventors determined that one option is to combine a floating point multiplier with a traditional floating point adder. A traditional floating point adder operates by right-shifting the lesser operand's mantissa in order to align the smaller number's mantissa with that of the larger number. In effect, the smaller number's mantissa is shifted right in order to shift that number's binary point to the left, and into alignment with that of the larger number. This is referred to as the mantissa alignment step. To account for this, the smaller number's exponent is adjusted by increasing the value of the smaller exponent, to the point that the smaller number's exponent is equal to that of the larger number. Once alignment has been performed, the operands' mantissas can thus be added with relative ease, as a result of the one-to-one correspondence between each of the mantissas' bit positions.

Such a traditional addition paradigm then normalizes the result, reformatting the addition's result into that mandated by the floating point standard employed (e.g., IEEE 754). It will be noted that such normalization does not comprehend calculations involving de-normalized numbers (numbers whose binary representation is smaller than the smallest binary number the given processor is capable of representing in floating point format). De-normalized numbers are normally handled using software routines which are capable of accounting for the de-normalized format of the numbers involved. In the case of IEEE 754, the mantissa must be shifted such that there remains only a single significant bit to the left of the binary point (i.e., that there is a one in the one's place of the mantissa), with the exponent adjusted accordingly, as well as the result having a proper sign bit. Thus, if the result is less than 1b, the result's mantissa is left-shifted such that the mantissa has a single significant digit to the left of the binary point. However, because the addition's result may contain 2 significant bits, a facility for right-shifting the result's mantissa by one bit position must also be provided. The following example illustrates the preceding concepts.

An example of mantissa alignment is the addition of $1.001100 \times 2^5 b$ and $1.010000 \times 2^2 b$. Written in fixed-point format, these numbers appear as 1000110.0000b and 00000101.0000b, and it may be seen that their binary points would not be aligned if the leading zeros were ignored. As will also be apparent to one of skill in the art, it is difficult to add two numbers whose exponents did not agree. That being the case, the smaller of the two ($1.010000 \times 2^2 b$) is right-shifted a number of bit positions equal to the difference in their exponents (here, by 3 bit positions). This right-shifting results in the number $0.001010 \times 2^5$, which, as can be seen, is no longer a normalized number. The two mantissas may then be added as integer numbers, as illustrated in Equation 1:

$$\begin{array}{r} 1001100 \\ + \phantom{0}0001010 \\ \hline 1010110 \end{array} \quad (1)$$

In this case, the addition's result is normalized by definition, because the most significant bit position of the mantissa is the most significant bit of the result (i.e., a one). In the case where the operands have the same exponent (i.e., are of the same power of two), and given the fact that the two operands are normalized numbers, it is possible for the addition's result to require normalization.

Consider the case of adding the numbers $1.010000 \times 2^5$ and $1.100000 \times 2^5$. No right shifting of either mantissa need be performed, as the operands' exponents are in agreement (i.e., equal). However, when their mantissas are added (leaving the binary point in the numbers for purposes of illustration), we obtain the result illustrated in Equation 2:

$$\begin{array}{r} 1.010000 \\ + \phantom{0}1.100000 \\ \hline 10.110000 \end{array} \quad (2)$$

As can be seen, the addition results in a number having two significant digits to the left of the binary point. To address such situations, the result is right-shifted by one bit position (and its exponent incremented) to account for the extra significant digit. Thus, in a datapath implementing such an addition algorithm, there is normally provided a datapath for results that are already normalized, and a datapath having a one-bit right shifter, to account for the latter of the cases illustrated above.

When multiplying two numbers represented using a format such as IEEE 754, the exponents of the two numbers are simply added. The two mantissas, of course, are multiplied. This multiplication may be carried out, for example, by performing some combination of addition and/or shifting (which is equivalent to multiplication by 2). For example, two numbers can be multiplied using a radix-2 multiplication technique, which employs a combination of addition and shifting to arrive at a result. Alternatively, a series of adders can be used to implement multiplication, successively adding partial products. Such multipliers are known as array multipliers. Another multiplier architecture is the tree multiplier. Many other multiplier architectures exist.

As with the examples given for addition, the multiplication of two normalized operands can result in an unnormalized number. Assuming two normalized numbers are input to the multiplier, a number having two significant bits to the left of the binary point will normally result, as in the example illustrated in Equation 3:

$$\begin{array}{r} 1.110 \\ 1.110 \\ \hline 0000 \\ 11100 \\ 111000 \\ 1110000 \\ \hline 11.000100 \end{array} \quad (3)$$

However, because the numbers are normalized, the multiplication of their mantissas cannot generate a result having more than two significant bits to the left of the binary point (i.e., 1.11111111 . . . b (the extent of which depends on the precision employed)). The exponents, as will be evident to one of skill in the art, are simply added. Normalization can be effected by right-shifting the result's mantissa, if necessary, and adjusting the result's exponent.

In a datapath that implements an FMULADD instruction by coupling a traditional adder architecture to a floating point multiplier that computes (A*B), each addition operand (C and (A*B)) is input to a respective variable right-shifter (i.e., a right-shifter capable of shifting the input value a variable number of bit positions to the right), in the manner described. After determining which of the two operands is smaller, the adder's control circuitry causes the lesser number's mantissa to be right-shifted in order to make the lesser number's exponent equal that of the greater number, also in the manner described. Thus, the datapaths of both operands contain variable right shifters.

When an FMULADD instruction is implemented by coupling a floating point multiplier to a traditional adder, the variable right-shifter at each input of the adder must wait for its respective input data in order to generate a shifted version thereof, if necessary. The mantissa of the smaller operand (either C or the result of (A*B)) is then shifted appropriately, such that the smaller operand's exponent matches that of the larger number (i.e., such that the binary points in the two numbers' mantissas are aligned).

Because the input from the multiplier to its respective right-shifter would be unnormalized, it can assume a value of the form "XX. - - - " (i.e., a number having a maximum of two significant digits, as noted previously), with the result that the addition could result in a value of the form "XXX. - - - " (i.e., a number having a maximum of three significant digits), requiring a two-bit right shift (a function not associated with the normalization circuitry of a traditional adder). The inventors determined that this problem could be addressed by adding a two-bit right shifter to the traditional adder's normalization circuitry.

However, the inventors determined that the control section of such a fused instruction datapath employing a traditional adder architecture could be modified to account for the need to normalize the value of (A*B). The inventors determined that, because the multiplier's output is already fed into a variable right-shifter, the right-shifter associated with the multiplier's output could be made to shift the multiplier's output right by at least one bit position (i.e., always right-shift a minimum of one bit position, and more if that was necessary to align the mantissas). Thus, a normalized version of the multiplier's output could be had by modifying the control circuitry, obviating the need to add a two-bit right shifter to the adder's normalization circuitry.

While these modifications enable a fused datapath employing a traditional adder architecture to produce correct results without the addition of a two-bit right shifter to the normalization circuitry normally associated with a traditional adder architecture, the inventors determined that a fused instruction could be made more efficient by performing certain operations in parallel. The inventors determined that the fused instruction's efficiency could be improved by removing the shifter associated with the multiplier, and replacing the shifter associated with the other operand (C) with a bi-directional shifter. Thus, C's mantissa is always shifted when the C's exponent is not equal to that of the exponent of the multiplication's unnormalized result (while the multiplication's result is never shifted). C's mantissa is shifted to the right or to the left, as may be required to make C's exponent equal to that of the multiplication's result. Because the value of the exponent of (A*B) can be quickly determined and C's exponent adjusted (i.e., C's mantissa aligned with that of (A*B)), in comparison to the time required to compute the mantissa of (A*B), these operations can be performed in parallel with the multiplication of (A*B), as is explained in greater detail below.

However, this alteration opened the possibility of large differentials between C and (A*B), and large shifts in order to normalize the result of such computations. In order to address this possibility, the difference between C's exponent and that of the multiplication's result, and the values of C and (A*B) are examined. The first case, referred to herein as a large exponent difference (LED), results when the absolute value of the difference between C's exponent and that of the multiplication's result is greater than two, and C is greater than A*B. In this case, the result will need to be right-shifted by a number of bit positions equal to the number of bit positions required to make C's exponent equal to that of (A*B). Further, this shifting may still need a one-bit right or left shift, as explained below.

The second case is referred to herein as a small exponent difference (SED). An SED scenario occurs when there is a small difference between two numbers and one of the numbers is to be effectively subtracted from the other. In the case of a non-fused instruction, such a situation can occur when the difference in the two numbers' exponents is less than or equal to one. For example, in the case of an exponent difference of one:

$$1.0000 \ldots 00 \times 2^N \qquad (4)$$
$$- \ 0.1111 \ldots 11 \times 2^N$$
$$\overline{0.0000 \ldots 01 \times 2^N}$$

A similar situation in the case of an exponent difference of zero can easily be envisioned:

$$1.0000 \ldots 01 \times 2^N \qquad (5)$$
$$- \ 1.0000 \ldots 00 \times 2^N$$
$$\overline{0.0000 \ldots 01 \times 2^N}$$

As can be seen, such situations can result in the need for a large normalization left shift, which is time consuming and results in a more complex design. It will also be seen that, for larger exponent differences, such a condition does not occur. For example, in the case of an exponent difference of two:

$$1.0000 \ldots 00 \times 2^N \qquad (6)$$
$$- \ 0.0111 \ldots 11 \times 2^N$$
$$\overline{0.1000 \ldots 01 \times 2^N}$$

As can be seen, a left normalization shift of only one bit position is required to normalize the result. Larger exponent differences arrive at a similar result.

In the case of a fused instruction, because the result of the multiplication can have two significant digits, an SED condition can occur for exponent differences of less than or equal to two. An exponent difference between C's exponent and the exponent of the unnormalized result of (A*B) of two can cause a result requiring a large normalization left shift. For example:

$$100.0000 \ldots 00 \times 2^{NC} \qquad (7)$$
$$- \ 11.1111 \ldots 11 \times 2^{AB}$$
$$\overline{0.0000 \ldots 01 \times 2^{AB}}$$

where NC is the exponent of C after C has been normalized to the multiplication's unnormalized result (and so NC=AB) and AB is the exponent of the multiplication's unnormalized result (simply the addition of the exponents of A and B). As can be seen, with a difference of +2 between C's exponent and the exponent of the unnormalized result of (A*B) (i.e., indicating that C is greater than the unnormalized result of (A*B), and is so by two orders of (binary) magnitude), the mantissa of C must be left shifted two bit positions and C's exponent reduced by two. Given that C=1.000 . . . 000x$2^{NC+2}$, the result of left-shifting by two is that C=100.000 ... 000x2$^{NC}$ (as C appears in Equation 7). If the result of (A*B) is 11.1111 ... 11x2$_{AB}$, the situation exemplified in Equation (7) occurs. In the case of addition, such a scenario could give rise to the need for a right shift of up to three bits. As noted previously, a normal datapath provides only a one-bit right shifter, thus requiring the addition of a two-bit and a three-bit right shifter to the datapath. Embodiments of the present invention address such SED scenarios, and are described in greater detail below.

Exemplary Process of Performing a Fused Instruction

FIG. 1 illustrates generally the process of performing a fused multiply/add (or multiply/subtract) instruction. Fused multiply/add and multiply/subtract instructions are generally referred to herein as fused instructions, and as well as by the mnemonics FMULADD and FMULSUB. While the process illustrated in FIG. 1 depict the performance of certain tasks in parallel (in the interests of efficiency and processing speed), these tasks may also be carried out in a serial fashion. In the process depicted, two numbers, A and B, are multiplied together and a third value, C, added to (or subtracted from) the result (i.e., the value of (A*B)±C is computed). The numbers A, B, and C are floating point numbers and may be formatted according to any one of a number of standards. Preferably, A, B, and C are formatted using the IEEE 754 standard for floating point numbers, as previously noted.

As noted, FIG. 1 depicts a flow diagram of the operations performed in executing a fused multiply/add (or multiply/subtract) instruction according to an embodiment of the invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the embodiments described herein are described in terms of hardware (circuits that can be, for example, implemented in the design of a processor), the various exemplary modules thus described may be implemented using firmware, software modules and/or manually entered user commands. Such software modules discussed herein may include script, batch or other executable files, or combinations and/or portions of such files. Such software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be implemented separately in circuitry or executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Moreover, when implemented in software, each of the blocks of FIG. 1 may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module. The preceding discussion is equally applicable to the other flow diagrams described herein.

Processing of a fused instruction illustrated in FIG. 1 includes the multiplication of the multiplicands (referred to herein as A and B) (step 100). As previously noted, normalization of the number to be added to the multiplication's result can be performed concurrently with the multiplication. Thus, C is normalized to (A*B) in order to make C's exponent equal to the exponent of the unnormalized result of the multiplication of A and B (step 110). This normalization amount is then stored for use during large exponent difference processing, should that be required (step 120). Once these actions have been performed, the result of the multiplication and the normalized value of C are added (step 130). It will be noted that the values actually used in the computations described herein are the mantissas of their respective operands, although the mathematical operations and shifting that is performed do affect the exponents of their respective operands. A determination is then made as to whether SED processing or LED processing should be performed (step 140). If the exponent difference is greater than 2 and C is greater than (A*B), LED processing is performed (step 150). Otherwise, SED processing is performed (step 160). The effect of this test is to designate results of the unnormalized version of (A*B)±C as LED if C is greater than (A*B) by an order of three magnitudes or more.

Figure 2:
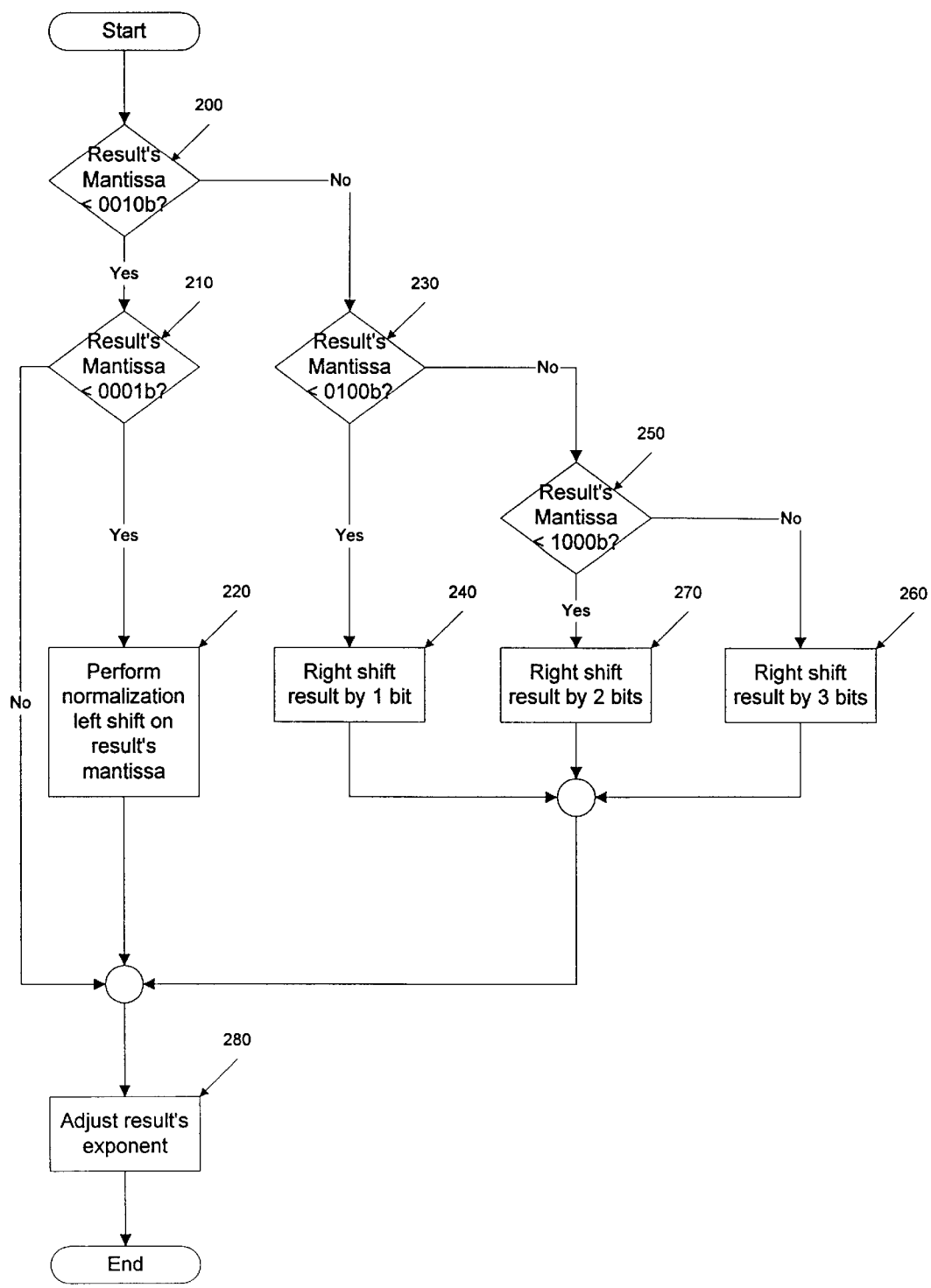
FIG. 2 is a flow diagram illustrating actions performed in small exponent difference processing according to one embodiment of the present invention.

FIG. 2 shows a flow diagram illustrating actions performed in SED processing. As noted, SED processing is performed in situations where the difference between C's exponent and the exponent of the multiplication's result is less than or equal to two and C is greater than A*B. First, the unnormalized result of the fused instruction is normalized by left shifting this result, if necessary (steps 200 and 210). Normalization by left shifting the unnormalized result of the fused instruction may or may not be necessary, depending on the values of A, B and C. Unnormalized results having a value of between 1 and 2 will automatically be normalized and so will require no normalization. This is also true for values that require right shifting (i.e., values greater than 0010b).

FIG. 2 illustrates a process for normalizing the unnormalized result of a fused instruction in the situation where a small exponent different exists between C and (A*B). First, the fused instruction's unnormalized result is compared with 0010b (step 200). If the unnormalized result is less than 0010b, this indicates that any normalization can be accomplished by left shifting the unnormalized result, if necessary. Normalization by left shifting of the unnormalized result is necessary only if the unnormalized result is less than 01b (step 210). If the unnormalized result is between 0001b and 0010b (that is, between decimal 1 and decimal 2), the unnormalized result requires no normalization because the result's mantissa is in the proper format for IEEE 754, as is the result's exponent. In other words, for a result of the form 1.xxxxxx*2$^{exp}$b, no normalization need be performed because the mantissa contains only a single significant bit to the left of the binary point (and so the result's exponent requires no adjustment).

However, if the unnormalized result is less than 0001b, normalization by left shifting must be performed to move the most significant 1 into the one's place of the mantissa (i.e., the first bit position to the left of the binary point) (step 220). This is illustrated in Equations 8 below:

$$\begin{array}{r}1.000000\\+\ 0.100000\\\hline 0.100000\end{array} \quad (8)$$

where the top number is an exemplary value of (A*B) (e.g., $1.0 \times 2^1 * 1.0 \times 2^{-1}$) and the lower number is an exemplary value of C (e.g., $1.0 \times 2^{-1}$). As can be seen, a left shift of one bit position is required to normalize the resulting mantissa, along with an appropriate adjustment of the associated exponent.

If the unnormalized result is not less than 0010b, or in the alternative, the unnormalized result is greater than or equal to 0010b, the result is compared to 0100b (step 230). If the unnormalized result is less than 0100b (step 230), and because the unnormalized result must be greater than or equal to 0010b by this point, it can be deduced that the unnormalized result contains two significant bits to the left of the binary point. Given this fact, in order to normalize the unnormalized result, the unnormalized result is right-shifted by one bit position (step 240). This is illustrated in Equation 9 below:

$$\begin{array}{r}1.001000\\+\ 1.100000\\\hline 11.101000\end{array} \quad (9)$$

As can be seen, a right shift of one bit position is required to normalize the resulting mantissa, along with an appropriate adjustment of the associated exponent.

If the unnormalized result is greater or equal to 0100b, the unnormalized result is compared to 1000b (step 250). If the unnormalized result is greater than or equal to 100b, it can be assumed that the unnormalized result contains four significant bits to the left of the binary point and so a right shift of the unnormalized result by three bit positions will place the mantissa in IEEE 754 format (step 260). This is illustrated in Equation 10 below:

$$\begin{array}{r}11.001000\\+\ 110.100000\\\hline 1001.101000\end{array} \quad (10)$$

As can be seen, a right shift of three bit positions is required to normalize the resulting mantissa, along with an appropriate adjustment of the associated exponent.

If the unnormalized result is less than 1000b, it can be deduced that the unnormalized result contains three significant bits to the left of the binary point, and that the unnormalized result can be normalized by right shifting the result by two bit positions (step 270). This is illustrated in Equation 11 below:

$$\begin{array}{r}11.101000\\+\ 1.100000\\\hline 101.001000\end{array} \quad (11)$$

This is also illustrated in Equation 12 below:

$$\begin{array}{r}11.001000\\+\ 10.100000\\\hline 101.101000\end{array} \quad (12)$$

As can be seen in both examples, a right shift of two bit positions is required to normalize the resulting mantissa. As noted previously, when shifting the mantissa of the unnormalized result, the unnormalized result's exponent must be adjusted to take into consideration any shifting performed (step 280). This is basically a one-to-one correspondence, meaning that the result's exponent is increased by one for every bit position the result's mantissa is right shifted, for example.

Figure 3:
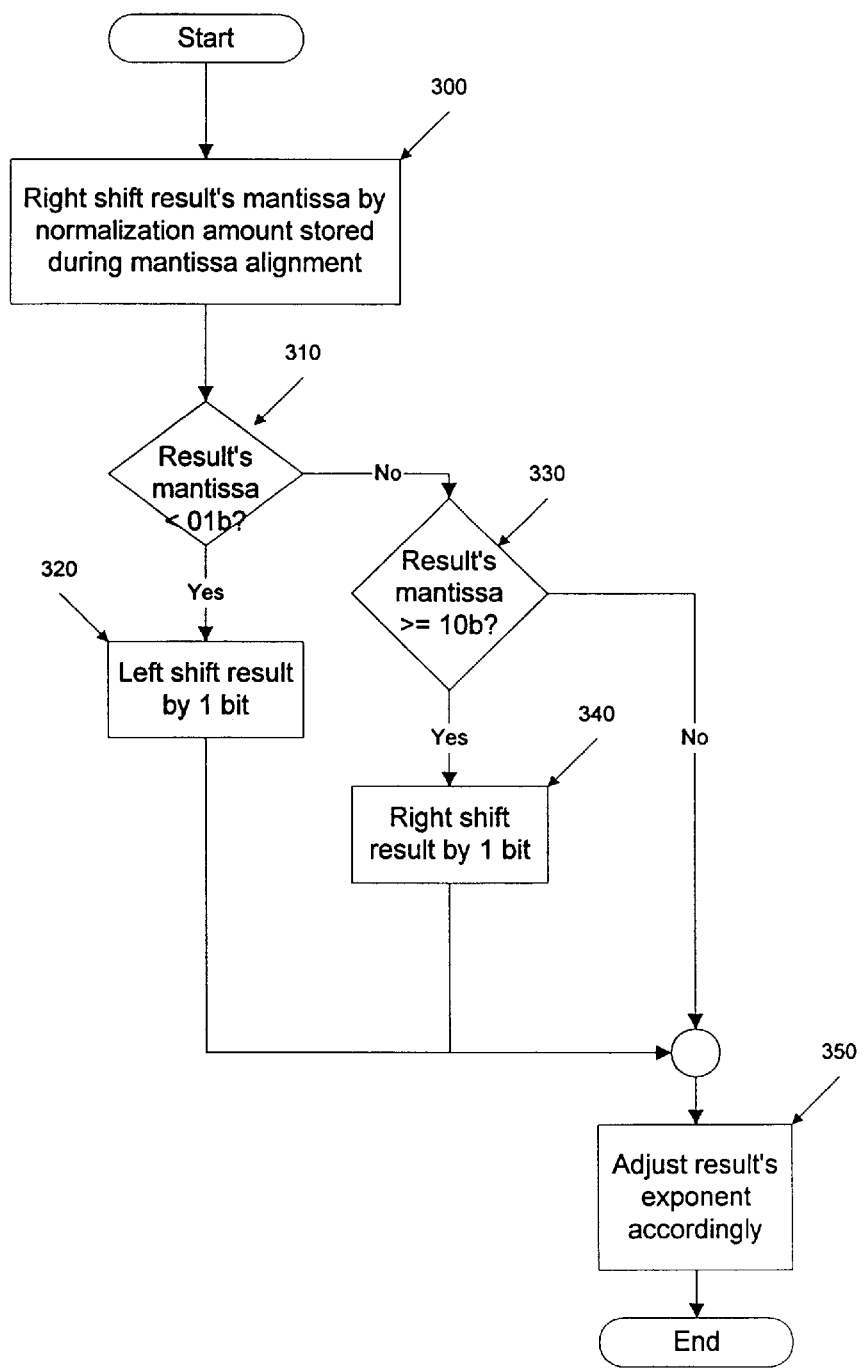
FIG. 3 is a flow diagram illustrating actions performed in processing an unnormalized result in the case of a large exponent difference according to one embodiment of the present invention

FIG. 3 illustrates the steps performed in processing an unnormalized result in he case of a large exponent difference. The process begins with the right shifting of the unnormalized result by the normalization amount stored during mantissa alignment (step 120 of FIG. 1) (step 300). Because C's mantissa is always shifted, C's mantissa is shifted back in order to re-align the binary point to a known position. At this point, adjustment of the result's exponent may be performed. However, given the possibility of further shifting, the flow diagram of FIG. 3 situates this operation at the end of the process in order to simplify the description of the process. As will be apparent to one of skill in the art, this exponent adjustment can be carried out in two steps (one associated with the right shift performed in step 300 and a possible adjustment after any shifting that may be necessary), or in a single step at the end of the process (taking all shifting actually performed into account).

If the result, after being shifted right in step 300, is less than 01b (step 310), the result is left shifted by one bit in order to normalize the result (step 320). This is illustrated in Equation 13 below:

$$\begin{array}{r}1000.000\\+\ 10.010\\\hline 101.110\end{array} \quad (13)$$

where C is the top number (e.g., originally equal to $1.033\ 2^6$, then shifted left by three bits to equalize exponents) and (A*B) (e.g., $1.1 \times 2^1 * 1.1 \times 2^2$). The result must then be right-shifted three bit positions to account for the shifting previously performed to the value of C. This results in $0.101110 \times 2^3$, an unnormalized number. As can be seen, a left shift of one bit position is required to normalize the resulting mantissa (leading to the correct and normalized result of $1.01110 \times 2^2$).

If the result is greater than or equal to 01b, the result is compared to 10b (step 330). If the result is greater than or equal to 10b, the result is right shifted by one bit (step 340). This is illustrated in Equation 14 below:

$$\begin{array}{r} 1111.100 \\ +\quad 10.101 \\ \hline 10010.001 \end{array} \quad (14)$$

where C is the top number (e.g., originally equal to $1.111100 \times 2^6$, then shifted left by three bits to equalize exponents) and (A*B) (e.g., $1.1 \times 2^1 * 1.11 \times 2^2$). The result must then be right-shifted three bit positions to account for the shifting previously performed to the value of C. This results in $10.010001 \times 2^3$, an unnormalized number. As can be seen, a further right shift of one bit position is required to normalize the resulting mantissa (leading to the correct and normalized result of $1.0010001 \times 2^2$).

If the result is less than 10b (and, by definition, the result is greater than or equal to 01b), no further shifting is required to normalize the result. This is illustrated in Equation 15 below:

$$\begin{array}{r} 1100.000 \\ +\quad 1.000 \\ \hline 1101.000 \end{array}$$

where C is the top number (e.g., originally equal to $1.100000 \times 2^3$, then shifted left by three bits to equalize exponents) and (A*B) (e.g., $1.0 \times 2^1 * 1.0 \times 2^{-1}$). The result must then be right-shifted three bit positions to account for the shifting previously performed to the value of C. This results in $1.101000 \times 2^0$, and so leads to the correct and normalized result. As can be seen, no further shifting is thus required to normalize the resulting mantissa.

Exemplary Fused Instruction Datapath

Figure 4:
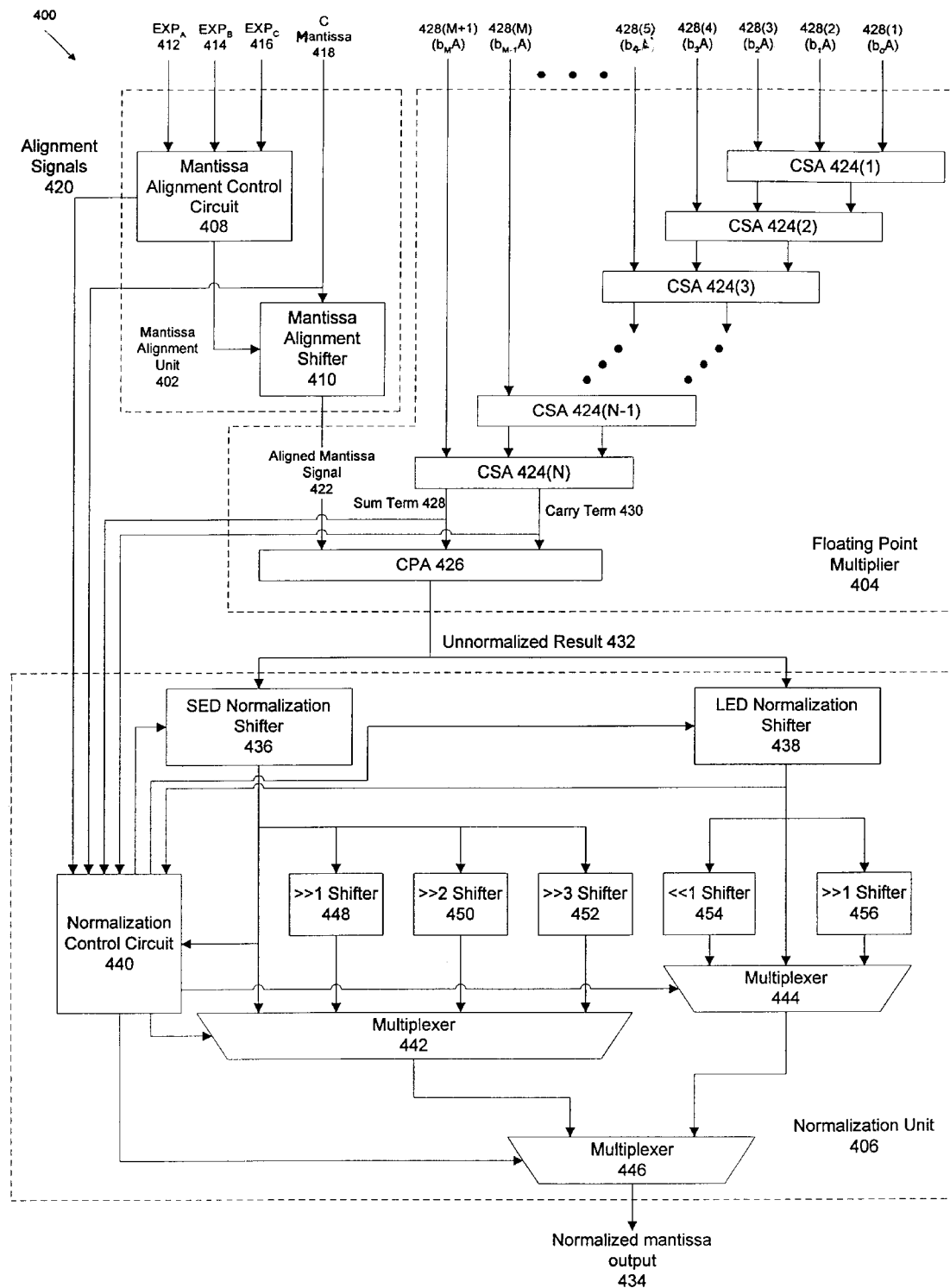
FIG. 4 is a block diagram illustrating a circuit capable of performing a fused instruction according to one embodiment of the present invention

FIG. 4 is a block diagram illustrating a circuit capable of performing a fused floating point multiply/add (or multiply/subtract). The major components of a fused instruction data path 400 are a mantissa alignment unit 402, a floating point multiplier 404, and a normalization unit 406. Mantissa alignment until 402 includes a mantissa alignment control circuit 408 and a mantissa alignment shifter 410. Mantissa alignment control circuit 408 takes as input an A exponent 412, a B exponent 414, and a C exponent 416, while mantissa alignment shifter 410 takes as input the mantissa of C (a C mantissa 418). In turn, mantissa alignment control circuit 408 generates alignment signals 420, as wells as the signals that control mantissa alignment shifter 410. Mantissa alignment shifter 410 shifts C mantissa 418 by the number of bit positions determined by mantissa alignment control circuit 408, resulting in an aligned mantissa signal 422.

Floating point multiplier 404 is depicted as employing a number of carry/save adders (CSA) (i.e., CSAs 424(1)–(N)) and a carry/propagate adder (CPA) 426. Each CSA generates a carry term and a sum term which, in combination with the next input term, results in the next carry term and sum term. CSAs 424(1)–(N) take as input multiplier inputs 428(1)–(M), which correspond to partial products that are calculated as inputs to CSAs 424(1)–(N). These values are derived by multiplying the bits of A by one of the bits of B. This "multiplication" is relatively simple, the output being the bits of A if the given bit of B is a one, and zeros if the given bit of B is a zero. Thus, as shown in FIG. 4, multiplier input 428(1) corresponds to A multiplied by the least significant bit of B ($b_0$), multiplier input 428(2) corresponds to $b_1 A$, multiplier input 428(3) corresponds to $b_2 A$ and so on, as shown in FIG. 4. The output of CSA 424(N) is shown as including a sum 428 and a carry 430 which are provided to CPA 426. Also provided to CPA 426 is aligned mantissa signal 422 from mantissa alignment shifter 410. The addition of aligned mantissa signal 422 with sum term 428 and carry term 430 results in an unnormalized result 432.

Various multiplier architectures can be used to implement floating point multiplier 404. For example, a multiplier using a single adder could be employed, such as a carry-save multiplier. In a carry-save multiplier, registers are provided to store the operands A and B, and the carry and sum terms of the partial product (also referred to as P). To operate a carry-save multiplier, the sum and carry terms of P are loaded with zero, and registers A and B are loaded with their corresponding operand. The low-order sum bit of P is then shifted into register A, as well as shifting the operand held in register A itself to the right, one bit position. Because the operand in register B is immediately added to the carry and sum terms held in register P, the shifting and adding proceeds quickly. Another alternative, and that shown in FIG. 4, is the use of an array multiplier, in which a number of adders (carry-save adders, in this case) partial products equal to one of the operands multiplied by a given bit of the other of the operands are provided to a given adder in the array. Other array multiplier architectures include a multipass array multiplier, which blends the concepts used in the carry-save multiplier and the array multiplier of FIG. 4 in order to allow a trade off between the area consumed by the multiplier (i.e., the number of adders implemented) and the speed of the multiplier. Another variation of the array multiplier is the even/odd array multiplier in which sets of multipliers work in parallel to reduce the time required to perform the computations. Yet another multiplier architecture is the tree multiplier, and more specifically, the Wallace tree multiplier which reduces computation time to log N by employing a tree structure that is capable of using full adders.

Unnormalized result 432 is provided to normalization unit 406 so that unnormalized result 432 can be normalized, which results in a normalized mantissa output 434. Unnormalized result 432 is provided to an SED normalization shifter 436, as well as an LED normalization shifter 438. Controlling SED normalization shifter 436 and LED normalization shifter 438 is a normalization control circuit 440. Normalization control circuit 440 also controls a multiplexer 442 in the SED data path, a multiplexer 444 in the LED data path, and a multiplexer 446 which selects the proper one of these two data paths, depending on the values received by normalization control circuit 440. The values received by normalization control circuit 440 can include, for example, alignment signals 420 from mantissa alignment control circuit 408 of mantissa alignment unit 402, C mantissa 418, sum term 428 and carry term 430, as well as the output of SED normalization shifter 436 and LED normalization shifter 438. It will be noted that alignment signals 420 include information such as that provided by A exponent 412, B exponent 414, C exponent 416, and a normalization amount stored for use in case LED normalization is required.

SED normalization shifter 436 provides its output directly to multiplex for 442, as well as to a 1-bit right shifter 448, a 2-bit right shifter 450, and a 3-bit right shifter 452. Multiplexer 442, under the control of normalization control circuit 440, is then used to select one of these values if a SED normalization is to be performed. In a similar fashion, the output of LED normalization shifter 438 is provided directly to multiplexer 444, as well as to a 1-bit left shifter 454 and a 1-bit right shifter 456. Under the control of normalization control circuit, 440, multiplexer 444 selects between the output of LED normalization shifter 438, 1-bit left shifter 454, and 1-bit right shifter 456.

The outputs of multiplexer 442 and multiplexer 444 are then fed into multiplexer 446 which, under the control of normalization control circuit 440, selects one of these two outputs as normalized mantissa output 434. As will be apparent to one of skill in the art, the various shifters of normalization unit 406 can be designed into that unit's multiplexers. Because the shifts are fixed, multiplexers 442 and 444 can be designed to select a data path with its bit lines shifted to the right by one bit position (i.e., each input bit line connected to the next most significant output bit line), for example. Moreover, multiplexers 442, 444 and 446 are shown as separate multiplexers for the sake of clarity and ease of understanding. Multiplexers 442, 444 and 446 can be combined into a single multiplexer without causing any significant changes in the circuit's function. By designing the shifters into a single multiplexer, a great deal of the circuitry of normalization unit 406 can be simplified.

Exemplary Alternative Embodiments and Their Operation

Figure 5:
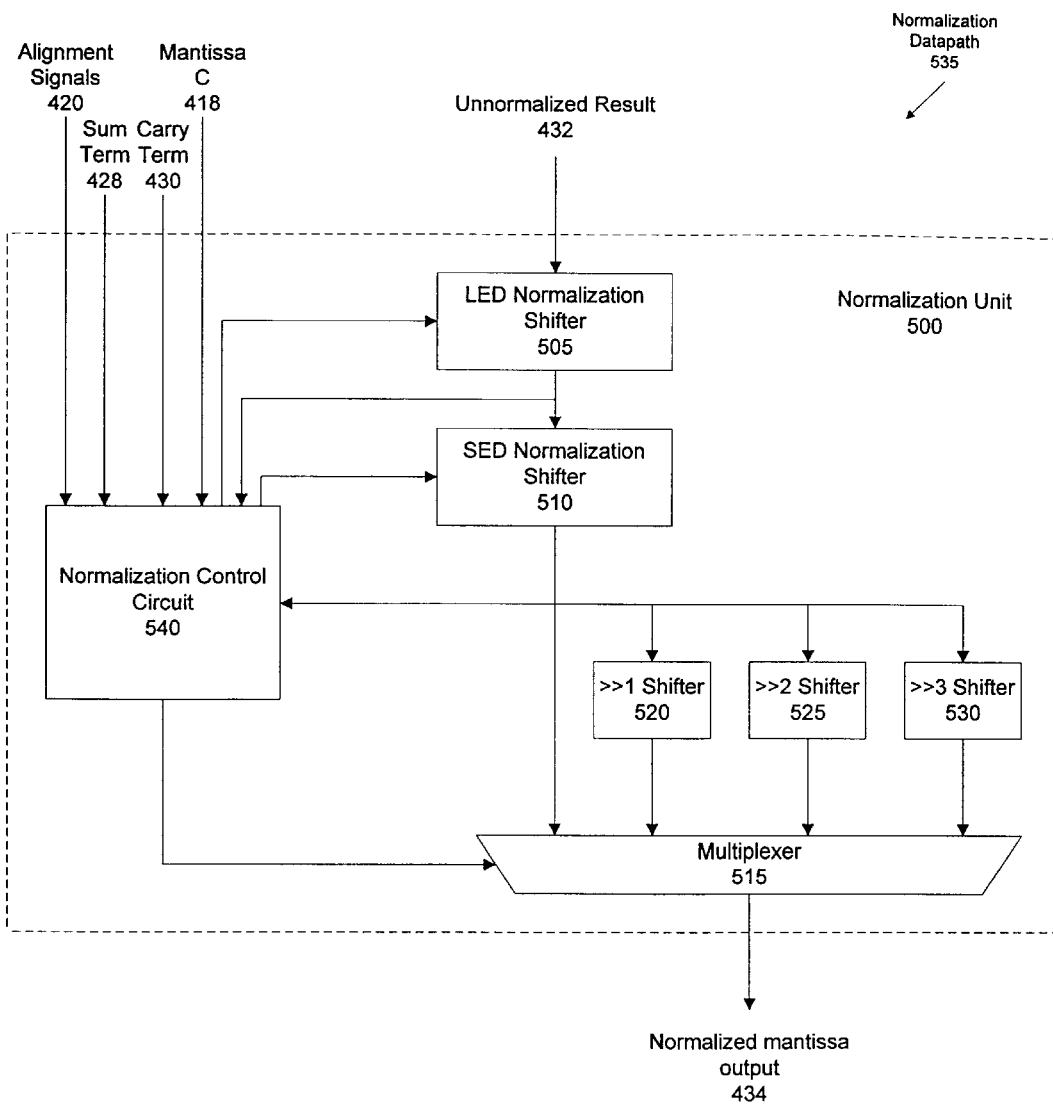
FIG. 5 is a block diagram illustrating an alternative embodiment of normalization unit according to one embodiment of the present invention.

FIG. 5 is a block diagram illustrating an alternative embodiment of normalization unit 406. This alternative embodiment, illustrated in FIG. 5 as a normalization unit 500, again includes an LED normalization shifter 505, an SED normalization shifter 510, and a multiplexer 515, which in combination with a 1-bit right shifter 520, a 2-bit right shifter 525, and a 3-bit right shifter 530, constitute a normalization data path 535. The components of normalization data path 535 are under the control of a normalization control circuit 540, which takes as input alignment signals 420, sum term 428, carry term 430, and C mantissa 418, in a fashion similar to normalization control circuit 440 as depicted in FIG. 4. Normalization unit 500 takes as its input unnormalized result 432, performs normalization on unnormalized result 432, and outputs this normalized value as normalized mantissa output 434, in a manner similar to that shown in FIG. 4.

As noted in the discussion of FIG. 4, shifters such as shifters 520, 525 and 530 in FIG. 5, can be designed into the multiplexer to which they are connected. For example, multiplexer 515 can be designed with one set of input bit lines from SED normalization shifter 510 configured to be coupled to corresponding bit lines of normalized mantissa output 434. Shifting performed by 1-bit right shifter 520 can be effected by coupling the bit lines from SED normalization shifter 510 to the next more significant bit line of normalized mantissa output 434. In a similar fashion, the functions of 2-bit right shifter 525 and 3-bit right shifter 530 can be effected by coupling the output bit lines of SED normalization shifter 510 to the second and third more significant bit lines of normalized mantissa output 434.

Moreover, normalization unit 500 could be further simplified by moving the function of 1-bit right shifter 520, 2-bit right shifter 525, and 3-bit right shifter 530 into LED normalization shifter 505, which is a variable right shifter and so capable of performing such functions. In such a case, normalization control circuit 540 is designed to cause LED normalization shifter 505 to perform all right shifts of unnormalized result 432 required to normalize that number that may be required, and SED normalization shifter 510 to perform all left shifts required to normalize unnormalized result 432. Thus, referring to FIGS. 2 and 3, LED normalization shifter 505 would be responsible not only for the right shifting described in step 300, but also the right shifting described in step 340, step 240, step 270, and step 260. In a similar fashion, SED normalization shifter 510 would be responsible for not only the normalization left shift of step 220, but also the 1-bit left shift of step 320.

Taking these simplifications a step further, the functions of LED normalization shifter 505 and SED normalization shifter 510 can be combined into a single, bi-directional shifter capable of shifting unnormalized result 432 directly into a normalized format for output at normalized mantissa output 434. In that case, normalization control circuit 540, using the various input signals provided, would determine the number of bit positions to shift unnormalized result 432, as well as the proper direction of the shift. As will also be apparent to one of skill in the art, by offering the fixed shifts that are performed, the order of LED normalization shifter 505 and SED normalization shifter 510 could be reversed.

Figure 6:
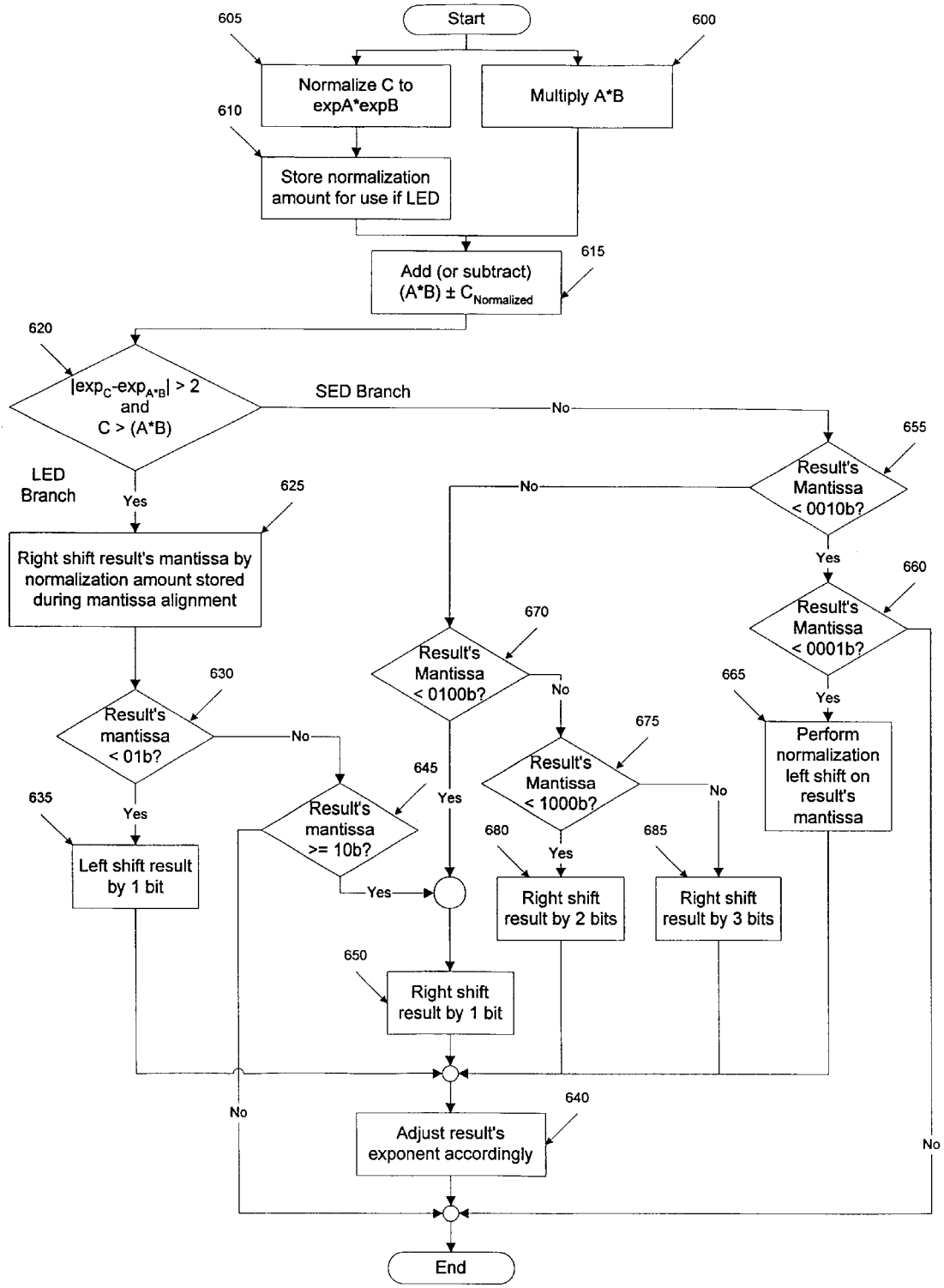
FIG. 6 is a flow diagram illustrating a normalization process which may be performed by a normalization data path according to one embodiment of the present invention.

FIG. 6 is a flow diagram illustrating a normalization process which may be performed by normalization data path 535. This process includes the multiplication of the multiplicands (referred to again as A and B) (step 600). As previously noted, normalization of the number to be added to the multiplication's result can be performed concurrently with the multiplication. Thus, C is normalized to (A*B) in order to make C's exponent equal to the exponent of the unnormalized result of the multiplication of A and B (step 605). This normalization amount is then stored for use during large exponent difference processing, should that be required (step 610). Once these actions have been performed, the result of the multiplication and the normalized value of C are added (step 615). It will be noted that the values actually used in the computations described herein are the mantissas of their respective operands, although the mathematical operations and shifting that is performed do affect the exponents of their respective operands. A determination is then made as to whether SED processing or LED processing should be performed (step 620). The effect of this test is to designate results of the unnormalized version of (A*B)±C as LED if C is greater than (A*B) by an order of three magnitudes or more.

If a large exponent difference condition exists, the result's mantissa is right shifted by an amount equal to the normalization amount stored during the alignment of C's mantissa (step 625). Once this shifting has been performed, the result's mantissa is compared to 01b (step 630). If the result's mantissa is less than 01b, the result's mantissa is left shifted by one bit (step 635). Once the result's mantissa has been normalized, the result's exponent is adjusted to account for any shifting performed on the result's mantissa (step 640). As noted previously this exponent adjustment is performed by increasing the exponent by one for each bit position shifted right, and decreasing the exponent for each bit position shifted left. Referring now to FIG. 5, it will be noted that the right shift performed in step 625 is performed by LED normalization shifter 505 and the left shift performed in step 635 can be performed by causing SED normalization shifter 510 to perform a single bit left shift. This economy of circuitry is realized because, in the embodiment depicted in FIG. 9, LED normalization shifter 505 is a right shifter configured to shift the result's mantissa by the fixed amount stored during mantissa alignment, while SED normalization shifter 510 is a left shifter configured to shift the mantissa a variable number of bits to the left. Thus, SED normalization shifter 510 can perform multiple duties, such as performing the left shift described in step 635, as well as the normalization left shift discussed subsequently.

Returning now to the discussion of FIG. 6, if the result's mantissa is not less than 01b (step 630), the result's mantissa is compared to 10b (step 645). If the result's mantissa is greater than or equal to 10b, no further action is required in the normalization of the result's mantissa. If the result's mantissa is greater than or equal to 10b, the result's mantissa is right shifted by 1 bit (step 650). In normalization data path 535 shown in FIG. 5, this 1-bit right shift is performed by 1-bit right shifter 520. As will be seen, 1-bit right shifter 520 becomes part of both the LED normalization and SED normalization data paths, collapsing step 240 of FIG. 2 and step 340 of FIG. 3 into a single step (step 650 of FIG. 6).

If a small exponent difference condition exists, the process proceeds to compare the result's mantissa to 0010b (step 655). If the result's mantissa is less than 0010b, the result's mantissa is compared to 0001b (step 660). If the result's mantissa is less than 0001b, a normalization left shift is performed on the result's mantissa (step 665), after which the result's exponent is adjusted accordingly (step 640). It will be noted the normalization left shift performed in step 665 is performed by SED normalization shifter 510 of FIG. 5.

If the result's mantissa is not less than 0001b (indicating that the result's mantissa is between 0001b and 0010b (i.e., that the result's mantissa is between decimal 1 and decimal 2 in value)), no shifting of the result's mantissa is required, as this value is already in a normalized format (i.e., with a single significant bit to the left of the binary point, or a value of 1.xxx . . . xxx, where the x's may be a zero or a one)). As a result of there being no need to shift the result's mantissa, it follows that no adjustment of the result's exponent is required, and so this path through the process of FIG. 6 is complete.

If the result's mantissa is not less than 0010b (step 655), the result's mantissa is compared to 0100b (step 230). If the result's mantissa is less than 0100b, aright shift of the result's mantissa by one bit position will suffice to normalize the result's mantissa (step 650). This 1-bit right shift is also performed by 1-bit right shifter 520. If the result's mantissa is not less than 0100b (step 670), the result's mantissa is compared to 1000b (step 675). If the result's mantissa is less than 1000b, this indicates that the result's mantissa has three significant bits, and so the result's mantissa is right-shifted by two bit positions (step 680). If the result's mantissa is not less than 1000b, this indicates that the result's mantissa contains four significant bits, and requires right-shifting by three bit positions (step 685). If the result's mantissa is right shifted or left shifted in performing the normalization, the result's exponent will require adjustment (step 640).

Exemplary Fused Instruction Datapath Employing Booth Recoding

Figure 7:
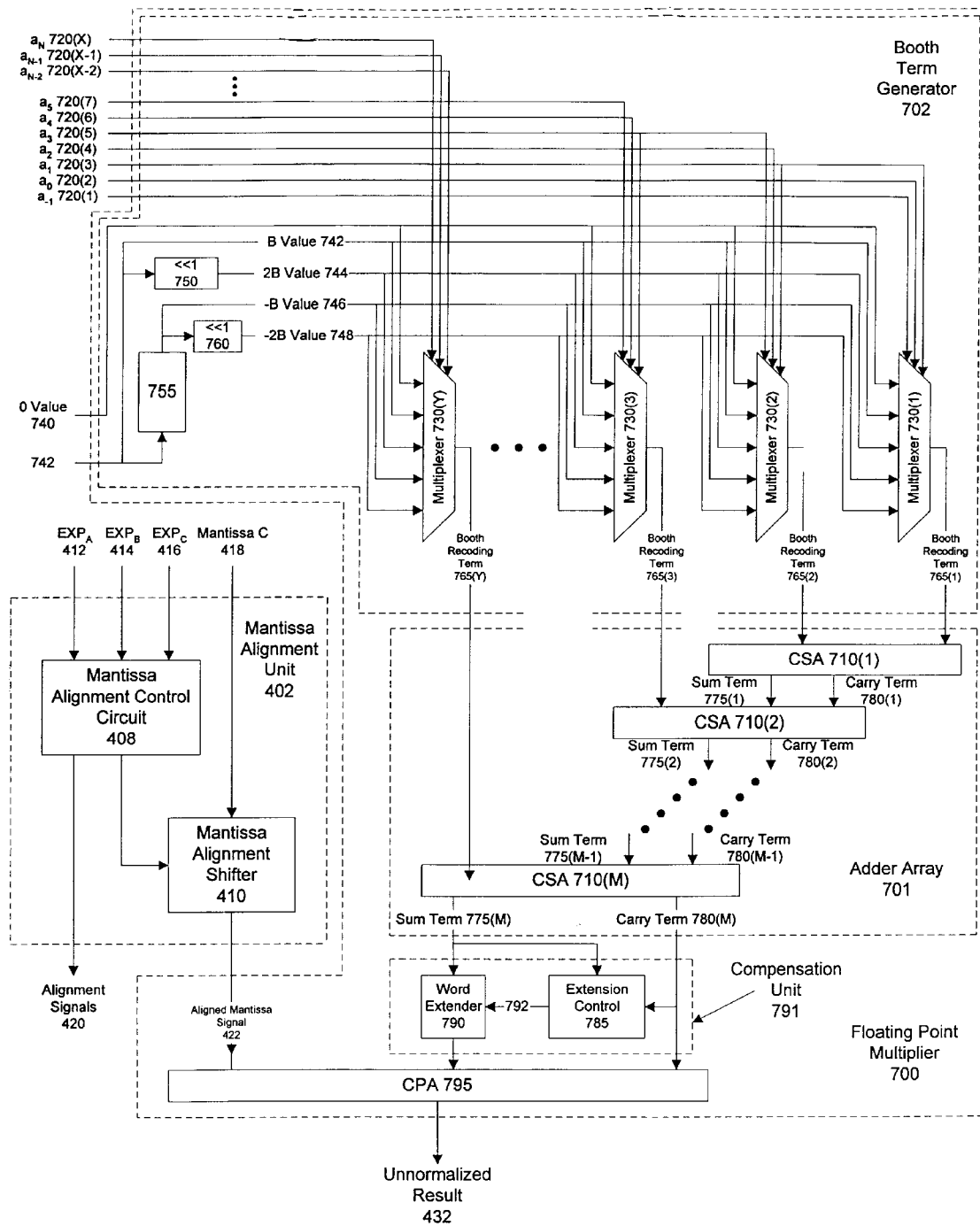
FIG. 7 is a block diagram illustration a floating point multiplier according to one embodiment of the present invention that employs Booth recoding.

FIG. 7 is a block diagram illustrating a floating point multiplier 700 that includes an adder array 701 and a Booth term generator 702. Together, adder array 701 and Booth term generator 702 form a term generation unit. Floating point multiplier 700 employs Booth recoding (via Booth term generator 702) to reduce the number of carry/save adders used. Booth recoding is a technique used in computer arithmetic to reduce the number of adders required to implement an array multiplier. In a radix-2 implementation, the algorithm computes a×b by examining the bits of a from least significant to most significant. For example, if a=7=0111b, then the technique successively adds B, adds B, adds B, and adds 0. Booth recoding "recodes" the number 7 as 8−1=1000b−0001b=100$\bar{1}$b, where $\bar{1}$ represents −1. This provides an alternate method of computing a×b; namely, successively subtracting B, adding 0, adding 0, and adding B.

With the proper recoding, a can be treated as an unsigned number, simplifying multiplication using negative numbers. For example, take a=−4=1100b. Think of 1100b as the unsigned number 12, and recode it as 12=16−4=10000b−0100b=10$\bar{1}$00b. If the multiplication algorithm is only iterated n times (n=4 in this case), the high-order digit is ignored, and we end up subtracting 0100b=4 times the multiplier to arrive at the right answer. This implies that multiplying using a recoded form of a will work equally well for both positive and negative numbers.

If the initial content of A is $a_{n-1}$ . . . $a_o$, then at the ith multiply step, the low-order bit of register A is $a_i$, and step (i) in the multiplication algorithm becomes I. If $a_i=0$ and $a_{i-1}=0$, then add 0.
II. If $a_i=0$ and $a_{i-1}=1$, then add B.
III. If $a_i=1$ and $a_{i-1}=0$, then subtract B.
IV. If $a_i=1$ and $a_{i-1}=1$, then add 0.

For the first step, when i=0, take $a_{i-1}$ to be 0.

Higher-radix multiplication may also be implemented using these techniques. As an example, suppose that k=2. If the pair of bits in question is 00, add 0, and if the pair of bits in question is 01, add B. If the pair of bits in question is 10, simply shift b one bit left before adding. Unfortunately, if the pair is 11, b+2b would appear to require computation. However, this can be avoided by using a higher radix version of Booth recoding. Imagine A as a base 4 number: When the digit 3 appears, change it to $\bar{1}$ and add 1 to the next higher digit to compensate. This scheme works for negative as well as positive numbers.

The precise rules for radix-4 Booth recoding are given in Table 1. At the ith multiply step, the bits of A examined are $a_{2i-1}$, $a_{2i}$ and $a_{i+1}$. These bits are used to select the multiple of b that must be added.

TABLE 1

Multiples of B to use for radix-4 Booth recoding.

| 2i + 1 | 2i | 2i − 1 | Multiple |
|---|---|---|---|
| 0 | 0 | 0 | 0 |
| 0 | 0 | 1 | +B |
| 0 | 1 | 0 | +B |
| 0 | 1 | 1 | +2B |
| 1 | 0 | 0 | −2B |
| 1 | 0 | 1 | −B |
| 1 | 1 | 0 | −B |
| 1 | 1 | 1 | 0 |

In order to employ Booth recoding in floating point multiplier 700, the proper Booth recoding terms (0, B, 2B, −2B, and B) must be provided to carry/save adders (CSAs) 710(1)–(M) based on the bit values of A. This selection is made possible by providing the bit values of A (bit values 720(1)–(X), which correspond to bits $a_{-1}$, $a_0$, $a_1$, $a_2$, $a_3$, $a_4$, $a_5$ . . . , $a_{N-2}$, $a_{N-1}$, and $a_N$) in various combinations to multiplexers 730(1)–(Y) of Booth term generator 702. Based on the values of bits 720(1)–(X), multiplexers 730(1)–(Y) select one of several Booth recoding values, illustrated in FIG. 7 as a zero value 740, a B value 742, a 2B value 744, a −B value 746, and a −2B value 748.

The value of 2B value 744 is generated from B value 742 by left-shifting B value 742 by one bit position using a 1-bit left shifter 750. The value of −B value 746 is generated from B value 742 by multiplying B value 742 by −1. This can be achieved in a number of ways, including the actual multiplication of B value 742 by −1, by taking the 2's compliment of B value 742, or some other appropriate method. This function is performed by a sign-change unit 755. The value of −2B value 748 is derived from −B value 746 by left-shifting −B value 746 one bit position using a 1-bit left shifter 760. Thus, all the necessary input values to multiplexers 730(1)–(Y) can be generated with relative ease.

It will be noted from a review of Table 1 that a radix-4 Booth recoding scheme is shown as using eight possible recoding values (0, B, B, 2B, −2B, −B, −B, and 0) depending on the 3 bit values required for calculating the given input term. For the sake of efficiency, the inventors found that multiplexers 730(1)–(Y) could be designed to take only the five unique input values described above and shown in FIG. 7. In fact, 2B value 744 and –2B value 748 could be generating internally to multiplexers 730(1)–(Y), obviating the need for 1-bit left shifters 750 and 760. This could be accomplished in the manner previously described by simply taking the bit lines of B value 742 and –B value 746 respectively, and connecting them to the next-higher bit position of their respective "shifted" values. The selection process results in a series of Booth recoding terms (represented in FIG. 7 as Booth recoding terms 765(1)–(Y)), which are fed into CSAs 710(1)–(M). From Booth recoding terms 765(1)–(Y), CSAs 710(1)–(M) generate sum terms 775(1)–(M) and carry terms 780(1)–(M).

When using a Booth recoding technique, it is possible for an extraneous carry to exist in the carry term propagated through the multiplier. This extraneous carry can be either explicit (appearing as a carry out during the multiplication process), or inherent (appearing only upon the combination of the sum and carry terms as a result of the final addition performed in the multiplication). This carry is an extraneous value and is ignored when performing a standard floating point multiplication because it appears in the most significant bit position of the carry term and so is carried out of the calculation. The extraneous carry is removed by simply ignoring the carry out from the combination of the last sum and carry terms in the array. However, in the processing of a fused instruction, the inventors found that this extraneous carry could cause erroneous results (e.g., depending on the value of C that was added to the multiplication's result).

Two situations therefore exist. If the extraneous carry occurs as a carry out generated by one of the earlier adders of the array, it is simply ignored during the calculations. In embodiments of the present invention, this extraneous carry causes no errors as it is disposed of prior to the calculation of (A*B)±C. However, if this extraneous carry has not been disposed of prior to reaching sum term 775(M) and carry term 780(M), its existence can cause an erroneous result in the calculation of (A*B)±C. As noted, this is referred to herein as an inherent carry.

To address this possible source of error, the inventors determined that by extending sum term 775(M) with either ones or zeros, depending on the situation, the existence of an inherent carry could be nullified. An extension control 785 can take as its input, for example, sum term 775(M) and carry term 780(M) and use this information to control word extender 790. Extension control 785 and word extender 790 form a compensation unit 791. One technique that can be employed in extension control 785 to determine whether or not an inherent carry exists is to use a CPA (not shown) in extension control 785. Such a CPA combines sum term 775(M) and carry term 780(M) in the manner of the final addition performed using these terms. If an inherent carry exists, a carry out is generated by the CPA. This carry out can then be used to control word extender 790 via an extension control signal 792. Alternatively, extension control 785 can be designed to take only carry term 780(M)as its input. Using this technique, extension control 785 examines the most significant bit of carry term 780(M) and uses that bit to control word extender 790 in the following manner.

Thus, if no inherent carry exists (i.e., the extraneous carry was explicit, and so has already been discarded), extension control 785 causes word extender 790 to extend sum term 775(M) with zeros to the full extent (i.e., maximum significant bit position) of a carry propagate adder (CPA) 795. In this case, because the extraneous carry has already been discarded, extending sum term 775(M) with zeros has no effect on the calculation of (A*B)±C, and so allows floating point multiplier 700 to arrive at the proper result, which is then provided to a normalization unit (not shown) as unnormalized result 432. In the case of an inherent carry, extension control 785 causes word extender 790 to extend sum term 775(M) with ones to the full extent of CPA 795. This has the effect of discarding an inherent carry by causing the inherent carry to carry out from the most significant bit of the value appearing as sum term 775(M) out of the range of CPA 795.

Extending the value appearing as sum term 775(M) with either zeros or ones is necessary because the mantissa represented by sum term 775(M) and carry term 775(M) may have fewer significant bits than the value presented to CPA 795 as aligned mantissa signal 422. In other words, due either to the shifting performed on the mantissa of C (mantissa C 418) by mantissa alignment shifter 410, or the values of A and/or B, the number of significant bits in the aligned mantissa of C can be greater than the mantissa of the multiplication's result. Because such a carry, which would normally be propagated out of the adder, can fall in the range of the aligned mantissa, the aforementioned steps must be taken in such cases to avoid the 1 appearing in the result of the addition. Thus, if the extraneous carry is an explicit carry (and so has already propagated out of one of the array multiplier's adders), sum term 775(M) is extended with zeros (as there is no need to compensate for an explicit carry). In contrast, if the extraneous carry is an inherent carry (and so has not propagated out during the preceding additions), sum term 775(M) is extended with ones in order to cause the inherent carry to propagate out the range of CPA 795, and so compensate therefor.

Figure 8:
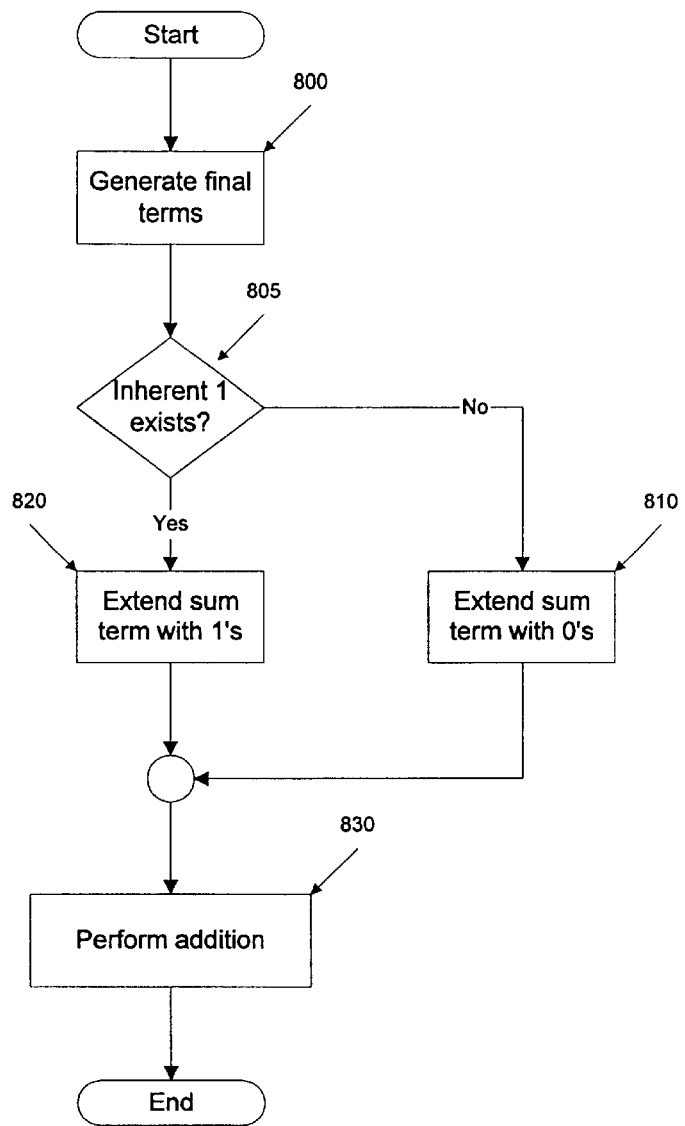
FIG. 8 is a flow diagram illustration a process performed by an extension control unit and word extender according to one embodiment of the present invention.

FIG. 8 is a flow diagram illustrating a process performed by extension control 780 and word extender 790 of FIG. 7. As noted, Booth term generator 702 in combination with CSAs 710(1)–(M) ultimately generate sum term 775(M) and carry term 780(M) (step 800). It will be noted that the architecture depicted in FIG. 7, although shown as being able to compensate for an inherent carry generated by Booth term generator 702 and CSAs 710(1)–(M), is applicable to any fused instruction architecture encountering such an anomaly. Extension control 785 examines sum term 775(M) and carry term 780(M) to determine if an inherent carry exists in these terms (step 805). If the extraneous carry was explicit, sum term 775(M) is extended with zeros to the full extent of CPA 795 (step 810). Alternatively, if the extraneous carry is inherent in sum term 775(M) and carry term 780(M), sum term 775(M) is extended with ones to the full extent of CPA 795 (step 820). With the value represented by sum term 775(M) properly adjusted, CPA 795 can correctly perform the addition of the aligned mantissa and the multiplication's result (step 830).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed:

1. A fused instruction datapath comprising:

a normalization unit;

a floating point multiplier, coupled to said normalization unit, wherein said floating point multiplier comprises:
a term generation unit configured to generate a sum term and a carry term; and
a compensation unit coupled to said term generation unit and configured to compensate the sum term, wherein said compensation unit comprises:
a word extender unit, coupled to receive a sum term from said tern generation unit; and
an extension control unit, coupled to receive a carry term from said term generation unit and to provide an extension control signal to said word extender unit;

a mantissa alignment unit, said mantissa alignment unit coupled to provide an aligned mantissa to said floating point multiplier; and a final adder, wherein said mantissa alignment unit and said compensation unit are coupled to said final adder.

2. The apparatus of claim 1, wherein said extension control unit is configured to
examine a most significant bit of said carry term,
indicate said carry term contains said inherent carry via said extension control signal, if said most significant bit of said carry term has a value of one, and
indicate said carry term does not contain said inherent carry via said extension control signal, if said most significant bit of said carry term has a value of zero.

3. The apparatus of claim 2, wherein said word extender unit is configured to
extend said sum term with ones if existence of said inherent carry in said plurality of terms is indicated by said extension control signal, and
extend said sum term with zeros if existence of said inherent carry in said plurality of terms is not indicated by said extension control signal.

4. The apparatus of claim 1, wherein said extension control unit is further coupled to receive said sum term form said term generation unit and configured to calculate a result by combining said sum and said carry terms.

5. The apparatus of claim 4, wherein said extension control unit is configured to
indicate said sum and said carry terms contain said inherent carry via said extension control signal, if a carry out of said result has a value of one, and
indicate said sum and said carry terms do not contain said inherent carry via said extension control signal, if said carry out of said result has a value of one.

6. The apparatus of claim 5, wherein said word extender unit is configured to
extend said sum term with ones if existence of said inherent carry in said plurality of term is is indicated by said extension control signal, and
extend said sum term with zeros if existence of said inherent carry in said plurality of terms is not indicated by said extension control signal.

7. A fused instruction datapath comprising:

a normalization unit;

a floating point multiplier, coupled to said normalization unit, wherein said floating point multiplier comprises:
a term generation unit, and
a compensation unit coupled to said term generation unit; and a mantissa alignment unit, said mantissa alignment unit coupled to provide an aligned mantissa to said floating point multiplier;

wherein said floating point multiplier further comprises a final adder, wherein said mantissa alignment unit and said compensation unit are coupled to said final adder, wherein said compensation unit comprises:
a word extender unit, coupled to receive a sum term from said term generation unit; and
an extension control unit, coupled to receive a carry term from said term generation unit and to provide an extension control signal to said word extender unit.

8. The apparatus of claim 7, wherein said extension control unit is configured to
examine a most significant bit of said carry term,
indicate said carry term contains said inherent carry via said extension control signal, if said most significant bit of said carry term has a value of one, and
indicate said carry term does not contain said inherent carry via said extension control signal, if said most significant bit of said carry term has a value of zero.

9. The apparatus of claim 8, wherein said word extender unit is configured to
extend said sum term with ones if existence of said inherent carry in said plurality of terms is indicated by said extension control signal, and
extend said sum term with zeros if existence of said inherent carry in said plurality of terms is not indicated by said extension control signal.

10. The apparatus of claim 7, wherein said extension control unit is further coupled to receive said sum term form said term generation unit and configured to calculate a result by combining said sum and said carry terms.

11. The apparatus of claim 10, wherein said extension control unit is configured to
indicate said sum and said carry terms contain said inherent carry via said extension control signal, if a carry out of said result has a value of one, and
indicate said sum and said carry terms do not contain said inherent carry via said extension control signal, if said carry out of said result has a value of one.

12. The apparatus of claim 11, wherein said word extender unit is configured to
extend said sum term with ones if existence of said inherent carry in said plurality of term is indicated by said extension control signal, and
extend said sum term with zeros if existence of said inherent carry in said plurality of terms is not indicated by said extension control signal.

* * * * *